US012773750B2

(12) United States Patent
Kitagawa et al.

(10) Patent No.: US 12,773,750 B2
(45) Date of Patent: Oct. 27, 2026

(54) LASER WELDING METHOD

(71) Applicant: HONDA MOTOR CO., LTD., Tokyo (JP)

(72) Inventors: Jun Kitagawa, Saitama (JP); Shimpei Takahara, Saitama (JP); Koji Fukuoka, Saitama (JP); Mitsutaka Igaue, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 488 days.

(21) Appl. No.: 18/528,789

(22) Filed: Dec. 5, 2023

(65) Prior Publication Data

US 2024/0198453 A1 Jun. 20, 2024

(30) Foreign Application Priority Data

Dec. 14, 2022 (CN) ......................... 202211606484.5

(51) Int. Cl.
*B23K 26/21* (2014.01)

(52) U.S. Cl.
CPC .................................... *B23K 26/21* (2015.10)

(58) Field of Classification Search
CPC ...................................................... B23K 26/21
See application file for complete search history.

(56) References Cited

U.S. PATENT DOCUMENTS

| | | | |
|---|---|---|---|
| 2021/0170527 | A1 | 6/2021 | Yasuoka et al. |
| 2023/0023739 | A1 | 1/2023 | Yasuoka et al. |

FOREIGN PATENT DOCUMENTS

| | | | |
|---|---|---|---|
| CN | 112533726 | A | 3/2021 |
| CN | 115335177 | A | 11/2022 |
| EP | 3520927 | A1 | 8/2019 |
| JP | 2002160083 | A | 6/2002 |
| JP | 2002219590 | A | 8/2002 |
| WO | 2021193855 | A1 | 9/2021 |

OTHER PUBLICATIONS

Office Action issued Jun. 18, 2026 in the CN Patent Application No. 202211606484.5.

*Primary Examiner* — Robert G Bachner
(74) *Attorney, Agent, or Firm* — CKC & Partners Co., LLC

(57) ABSTRACT

The purpose is to smooth a surface of a molten portion, to suppress formation of a sharp edge and an undercut at an end of the molten portion and in the vicinity of the end. A laser welding method includes emitting a laser beam onto a surface of a stack of a plurality of workpieces, and moving the laser beam in a predetermined traveling direction, thereby welding the plurality of workpieces to each other. The laser beam includes a main beam, a sub beam, a rear beam, and an end beam. The main beam is emitted onto a main region. The sub beam is emitted onto a sub region surrounding the main region. The rear beam is emitted onto a rear region located rearward of the main region. The end beam is emitted onto an end region located rearward of the rear region and outside of the sub region.

2 Claims, 5 Drawing Sheets

<COMPARATIVE EXAMPLE>

<PRESENT EMBODIMENT>

LASER WELDING METHOD

This application is based on and claims the benefit of priority from Chinese Patent Application No. CN202211606484.5, filed on 14 Dec. 2022, the content of which is incorporated herein by reference.

BACKGROUND OF THE INVENTION

Field of the Invention

The present invention relates to laser welding by which workpieces are welded to each other using a laser beam.

Related Art

There is laser welding by which a plurality of workpieces are welded to each other in such a way that a laser beam is emitted onto a surface of a stack of the plurality of workpieces to thereby melt the plurality of workpieces, and the laser beam that is being emitted onto the surface of the stack is moved in a predetermined traveling direction relative to the plurality of workpieces.

According to other laser welding of this type, a laser beam that is emitted onto a surface of a workpiece includes a main beam that is emitted onto a predetermined main region and sub beams that are emitted onto sub regions surrounding the main region.

Patent Document 1: PCT International Publication No. WO2021/193855

SUMMARY OF THE INVENTION

The present inventors have focused on the following points in respect of the above-described laser welding. In a case where the laser beam that is emitted onto a surface of a workpiece further includes a rear beam that is emitted onto a rear region located rearward of the main region, the rear beam reheats a molten portion of workpieces that has been melted by the main beam and smooths the surface of the molten portion. However, a sharp edge and an undercut may be formed at an end of the molten portion in a direction orthogonal to the traveling direction due to the laser beams that have traveled through the molten portion. Consequently, the quality of the surface of the workpiece deteriorates. Furthermore, a throat thickness of the molten portion near the end may be reduced, which may lead to a decrease in the welding strength between the workpieces.

The present invention has been made in view of the above circumstances, and an object of the present invention is to smooth a surface of a molten portion, to suppress formation of a sharp edge and an undercut at an end of the molten portion and in the vicinity of the end, and to ensure a throat thickness.

The present inventors have found that emitting an end beam onto an end region located rearward of the rear region and outside an end of the entirety of the sub regions in the orthogonal direction makes it possible to prevent or reduce the formation of a sharp edge and an undercut and ensure a throat thickness at the end of the molten portion and in the vicinity of the end, and have arrived at the present invention. The present invention provides a laser welding method having the following first and second aspects.

According to the first aspect, the laser welding method of welding a plurality of workpieces to each other includes emitting a laser beam onto a surface of a stack of the plurality of workpieces to thereby melt the plurality of workpieces, and moving the laser beam that is being emitted onto the surface of the stack in a predetermined traveling direction relative to the plurality of workpieces. The laser beam includes:

- a main beam that is emitted onto a predetermined main region;
- a sub beam that is emitted onto a sub region surrounding the main region;
- a rear beam that is emitted onto a rear region at a power density lower than a power density at which the main beam is emitted, the rear region located toward the opposite side of the traveling direction with respect to the main region; and
- an end beam that is emitted onto an end region, the end region located toward the opposite side of the traveling direction with respect to the rear region and outside in an orthogonal direction to the traveling direction with respect to an end of an entirety of the sub region in the orthogonal direction.

Due to this feature, a molten portion that has been melted by the main beam and the sub beam is reheated by the rear beam, thereby enabling smoothing of the surface of the molten portion. Furthermore, even in the case where a sharp edge and an undercut are temporarily formed at an end of the molten portion by the foregoing beams, the end beam can reheat the sharp edge and the undercut. This reheating rounds the sharp edge and the undercut, whereby the quality of the surface of the workpiece can be improved. Furthermore, this reheating renders it possible to make the molten portion thicker in the thickness direction of a throat thickness in the vicinity of the end. As a result, the throat thickness is ensured, whereby the welding strength between the workpieces can be ensured. As described above, the feature described above makes it possible to smooth the surface of the molten portion, prevent or reduce the formation of a sharp edge and an undercut at the end of the molten portion and the vicinity of the end, and ensure the throat thickness.

The second aspect is directed to an embodiment of the first aspect. In the laser welding method according to the second aspect, the end beam is emitted at a power density lower than the power density at which the rear beam is emitted.

This feature makes it less likely for non-end portions of the molten portion to be reheated and makes it possible to reduce the influence on the non-end portions of the molten portion.

As described above, the feature of the first aspect makes it possible to smooth the surface of the molten portion, prevent or reduce the formation of a sharp edge and an undercut at the end of the molten portion and the vicinity of the end, and ensure the throat thickness. The second aspect as an embodiment of the first aspect makes it possible to reduce the influence on the non-end portions of the molten portion.

DETAILED DESCRIPTION OF THE INVENTION

Embodiments of the present invention will be described below with reference to the drawings. It should be noted that the present invention is not limited to the following embodiments, and can be appropriately modified and implemented without departing from the spirit of the present invention.

First Embodiment

Figure 1:
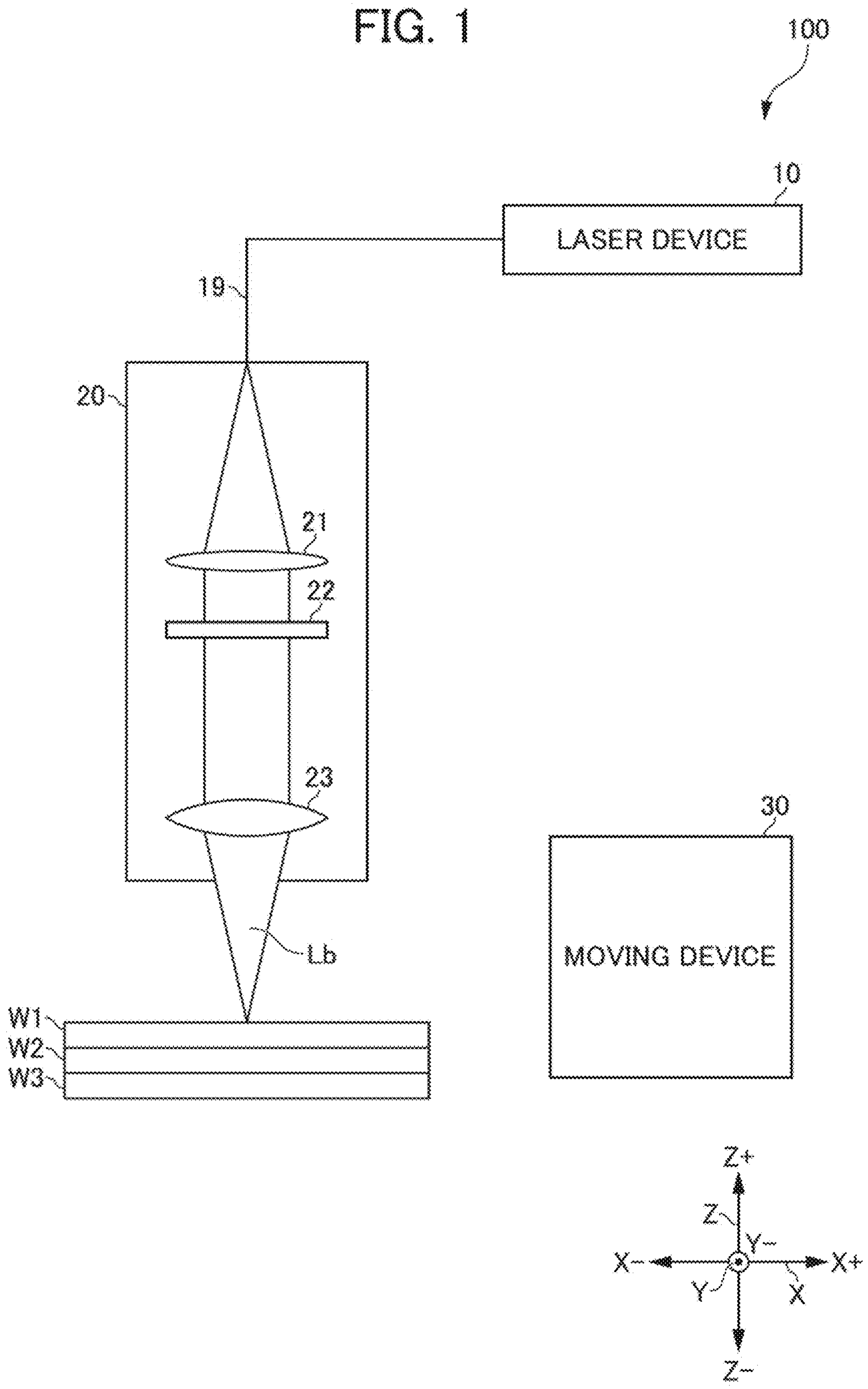
FIG. 1 is a configuration diagram illustrating a laser welder according to a first embodiment.

FIG. 1 illustrates a laser welder 100 that performs a laser welding method. In the laser welding method, a laser beam Lb is emitted onto a surface of a stack of a plurality of workpieces W1 to W3 to melt the plurality of workpieces W1 to W3, and the laser beam Lb that is being emitted onto the surface of the stack is moved in a predetermined traveling direction relative to the plurality of workpieces W1 to W3, thereby welding the workpieces W1 to W3 to each other. The laser welder 100 includes, for example, a laser device 10, an optical head 20, and a moving device 30. The laser device 10 and the optical head 20 are connected via an optical fiber 19.

Each of the workpieces W1 to W3 is, for example, a plate made of a metal material such as an iron-based material, an aluminum-based material, or a copper-based material. Hereinafter, a direction orthogonal to the surfaces of the workpieces W1 to W3 is simply referred to as a "surficial orthogonal direction". In the present embodiment, three workpieces W1 to W3 are stacked on each other in the vertical direction Z such that the surficial orthogonal direction coincides with the vertical direction Z. Hereinafter, the workpiece closest to an upside Z+ is referred to as a "first workpiece W1", the workpiece in the middle is referred to as a "second workpiece W2", and the workpiece closet to a downside Z− is referred to as a "third workpiece W3".

The laser device 10 includes a laser oscillator and outputs the laser beam Lb. The optical fiber 19 guides the laser beam Lb outputted from the laser device 10 to the optical head 20. The optical head 20 emits the laser beam Lb inputted from the laser device 10 onto a surface of the first workpiece W1. The optical head 20 includes, for example, a collimator lens 21, a diffractive optical element 22, and a condensing lens 23.

The collimator lens 21 converts the laser beam Lb inputted via the optical fiber 19 into parallel beams. The diffractive optical element 22 forms a desired beam shape by bending the parallel beams by diffraction and/or superimposing the parallel beams. Specifically, the diffractive optical element 22 forms the parallel beams into a beam shape that includes a main beam Lb1, sub beams Lb2, a rear beam Lb3, and end beams Lb4, which will be described later. The condensing lens 23 condenses the laser beam Lb from the diffractive optical element 22 and emits the condensed laser beam Lb onto the surface of the first workpiece W1.

In a state where the laser beam Lb is being emitted onto the surface of the first workpiece W1 and the plurality of workpieces W1 to W3 are melted, the moving device 30 moves at least one of the optical head 20 or the stack of the workpieces W1 to W3, thereby moving the optical head 20 in a predetermined traveling direction relative to the workpieces W1 to W3. In this way, the workpieces W1 to W3 are welded to each other.

Figure 2:
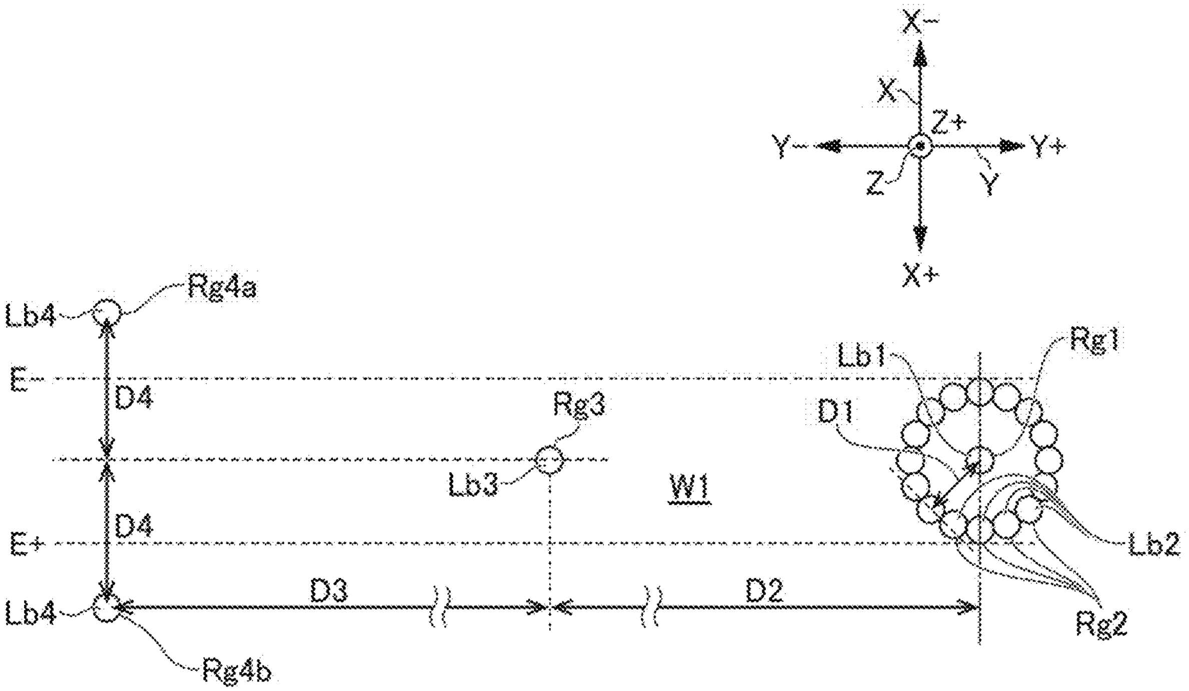
FIG. 2 is a plan view illustrating beam regions.

In the following description, as illustrated in FIG. 2, a side toward which the optical head 20 travels in the travel direction with respect to the workpieces W1 to W3 is referred to as a "forward side Y+", the side opposite to the forward side Y+ is referred to as a "rearward side Y−", and a direction toward the forward side Y+ and a direction toward the rearward side Y− are collectively referred to as a "forward-rearward direction Y". In the following description, a left side X− with respect to direction toward the forward side Y+ is simply referred to as a "left side X−", a right side X+ with respect to the direction toward the forward side Y+ is simply referred to as a "right side X+", and a direction toward the left side X− and a direction toward the right side X+ are collectively referred to as a "left-right direction X". The left-right direction X may be read as an "orthogonal direction to the traveling direction".

The laser beam Lb emitted from the optical head 20 to the workpieces W1 to W3 includes the main beam Lb1, the sub beams Lb2, the rear beam Lb3, and the end beams Lb4. In the following description, energy per unit time is referred to as "power", and power per unit area is referred to as "power density".

The main beam Lb1 is emitted onto a predetermined main region Rg1.

The sub beams Lb2 are emitted onto a plurality of sub regions Rg2 surrounding the main region Rg1, at a lower power density than a power density at which the main beam Lb1 is emitted. Specifically, for example, a total of 16 sub regions Rg2 are provided on a virtual circle centered at the center of the main region Rg1. In the following description, the sub beams Lb2 emitted onto the sub regions Rg2 located toward the forward side Y+ with respect to the center of the main region Rg1 are referred to as "sub beams Lb2 on the forward side Y+", and the sub beams Lb2 emitted onto the sub regions Rg2 located toward the rearward side Y− with respect to the center of the main region Rg1 are referred to as "sub beams Lb2 on the rearward side Y−".

The rear beam Lb3 is emitted onto a rear region Rg3 located toward the rearward side Y− with respect to the main region Rg1, at a lower power density than the power density at which the main beam Lb1 is emitted.

The end beams Lb4 are emitted onto a left end region Rg4*a* and a right end region Rg4*b*, which are located toward the rearward side Y− with respect to the rear region Rg3 and are spaced apart from each other in the left-right direction X. Specifically, the left end region Rg4*a* is located toward the left side X− with respect to a left end E− of the entire sub regions Rg2 surrounding the main region Rg1, and the right end region Rg4*b* is located toward the right side X+ relative to a right end E+ of the entire sub regions Rg2 surrounding the main region Rg1. The end beams Lb4 are emitted at a lower power density than the power density at which the rear beam Lb3 is emitted.

In the following description, a ratio of the power of the respective laser beams Lb1 to Lb4 to the power of the entire laser beam Lb emitted from the optical head 20 is referred to as a "power ratio". A power ratio of the main beam Lb1 is referred to as "PA1". A power ratio of the sub beams Lb2, that is, the power ratio of the beams emitted onto all the 16 sub regions Rg2 is referred to as "PA2". A power ratio of the rear beam Lb3 is referred to as "PA3". A power ratio of the end beams Lb4, that is, the power ratio of the beams emitted onto the two end regions Rg4*a* and Rg4*b* is referred to as "PA4". In the present embodiment, the diffractive optical element 22 sets the power ratios such that a relationship expressed as "(PA1+PA2):(PA3+PA4)=6:4" is satisfied, and a relationship expressed as "PA1>PA2" and a relationship expressed as "PA3>PA4" are satisfied. The power ratio of the end beam Lb4 emitted onto the end region Rg4*a* located toward the left side X− is the same as the power ratio of the end beam Lb4 emitted onto the end region Rg4*b* located toward the right side X+.

In the following description, a radius of the virtual circle mentioned above is referred to as "D1". A distance in the forward-rearward direction Y from the center of the main region Rg1 to the center of the rear region Rg3 is referred to as "D2". A distance in the forward-rearward direction Y from the center of the rear region Rg3 to the centers of the left and right end regions Rg4*a* and Rg4*b* is referred to as "D3". A distance in the left-right direction X from the center of the rear region Rg3 to the center of the left end region Rg4*a* and a distance in the left-right direction X from the center of the rear region Rg3 to the center of the right end region Rg4*b* are both referred to as "D4". In the present embodiment, the diffractive optical element 22 is set such that a relationship expressed as "D2>D3" and a relationship expressed as "D1<D4" are both satisfied.

Next, the functions of the beams will be described with reference to FIG. 3.

The sub beams Lb2 on the forward side Y+ melt the first workpiece W1 and the second workpiece W2 up to the interface therebetween, thereby reducing small spatters. Furthermore, the sub beams Lb2 on the forward side Y+ increase a molten amount in an area toward the forward side Y+ with respect to the main beam Lb1, thereby reducing large spatters.

The main beam Lb1 causes the heat originating from the beam to penetrate from the first workpiece W1 to the third workpiece W3 through the second workpiece W2, thereby forming a molten portion M extending across the three workpieces W1 to W3, and maintains the temperature distribution in the molten portion M. Furthermore, the main beam Lb1 ensures the width of the molten portion M in the left-right direction X at the interface between the second workpiece W2 and the third workpiece W3.

The sub beams Lb2 on the rearward side Y− control a convectional flow speed of the molten portion M in an area toward the rearward side Y− with respect to the main beam Lb1, thereby reducing large spatters.

The rear beam Lb3 reheats the molten portion M that has been melted by the main beam Lb1 and the sub beams Lb2, and thereby generates a convectional flow due to which undesired internal voids in the molten portion M tend to reach the back surface of the third workpiece W3. As a result, the undesired internal voids in the molten portion M are reduced, and the surface of the molten portion M is smoothed.

Next, a problem to be solved by the present embodiment will be described. Due to the main beam Lb1, the sub beams Lb2, and the rear beam Lb3 described above, a sharp edge Sp and an undercut Uc may be formed at an end of the molten portion M in the left-right direction X. Hereinafter, an end of the molten portion M in the left-right direction X is simply referred to as an "end of the molten portion M". Furthermore, a case where the end beam Lb4 is not emitted is referred to as a "comparative example".

Figure 4:
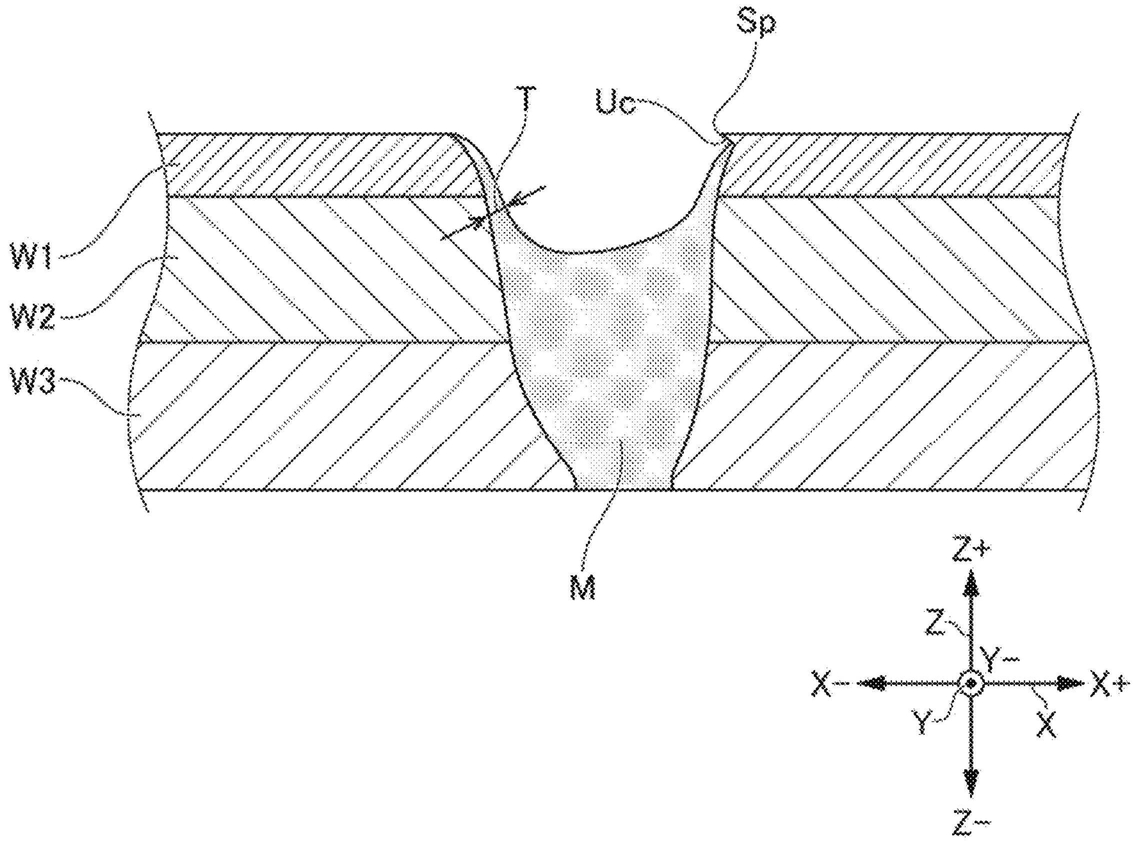
FIG. 4 is a front cross-sectional view illustrating workpieces subjected to laser welding according to a comparative example.

As illustrated in FIG. 4, in the comparative example, a sharp edge Sp and an undercut Uc remain as they are at the end of the molten portion M, whereby the quality of the surface of the first workpiece W1 deteriorates. Furthermore, the throat thickness T in the vicinity of the end of the molten portion M becomes thin.

Figure 3:
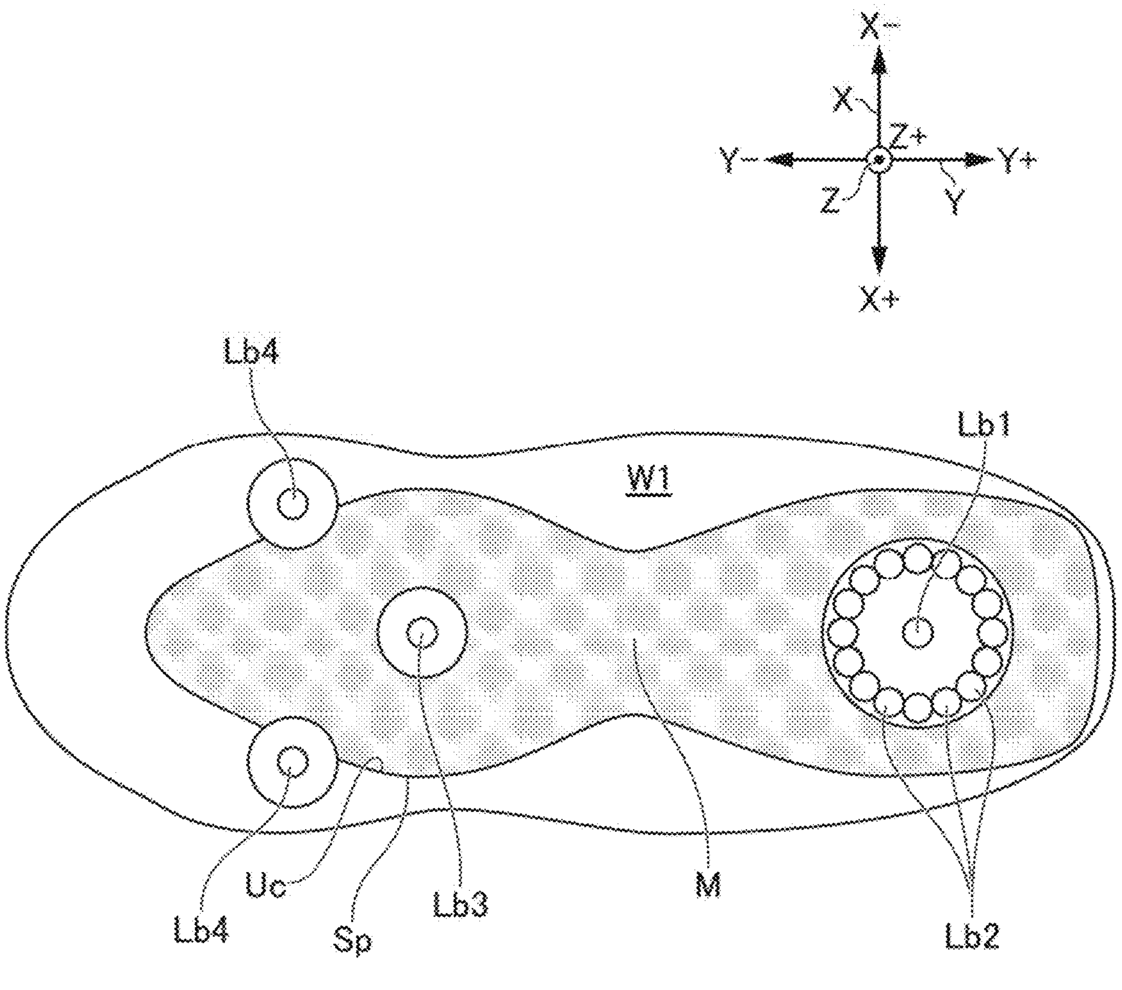
FIG. 3 is a plan view illustrating beam regions and a molten portion.
Figure 5:
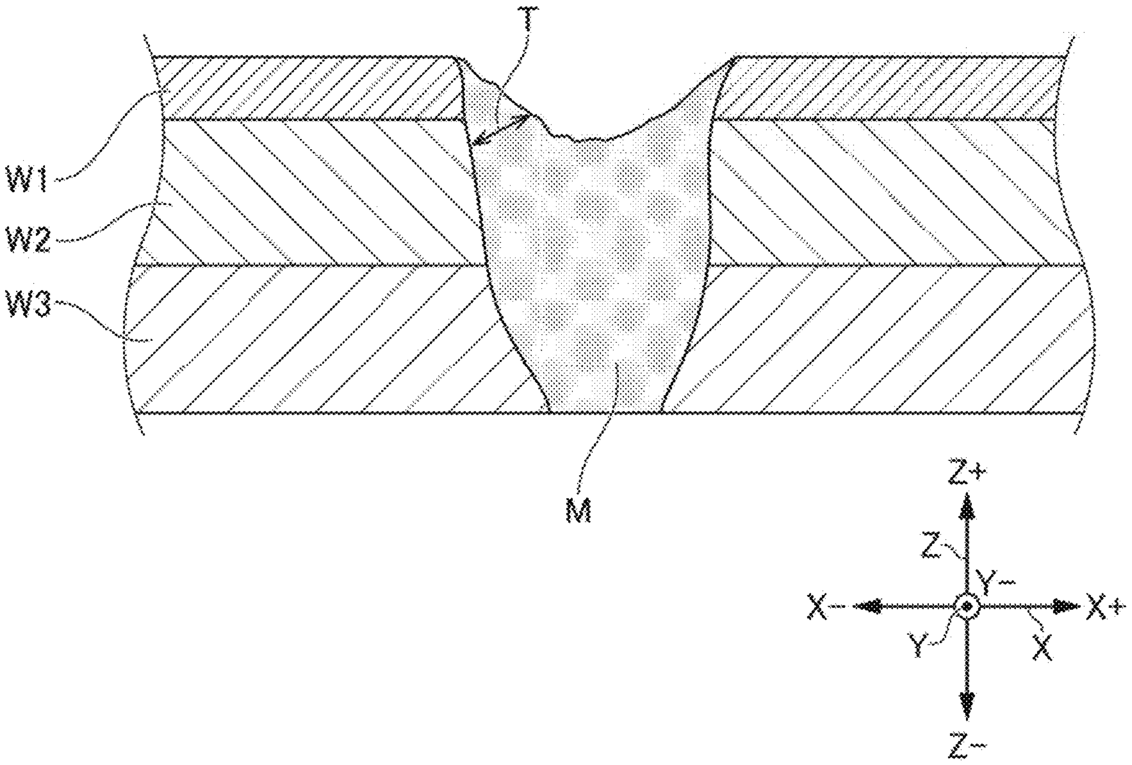
FIG. 5 is a front cross-sectional view illustrating workpieces subjected to laser welding according to the embodiment.

In contrast, in the present embodiment, as illustrated in FIG. 3, the sharp edge Sp and the undercut Uc are reheated by the end beam Lb4. As a result, as illustrated in FIG. 5, the sharp edge Sp and the undercut Uc can be rounded, and the molten portion M can be made thicker in the thickness direction of the throat thickness T in the vicinity of the end of the molten portion M.

The features and effects of the present embodiment will be summarized below.

According to the present embodiment, as illustrated in FIG. 3, the molten portion M that has been melted by the main beam Lb1 and the sub beams Lb2 is reheated by the rear beam Lb3, thereby enabling smoothing of the surface of the molten portion M. Furthermore, even in the case where a sharp edge Sp and an undercut Uc are temporarily formed at the end of the molten portion M by the beams Lb1, Lb2, and Lb3, the end beams Lb4 can reheat the sharp edge Sp and the undercut Uc. This feature makes it possible to round the sharp edge Sp and the undercut Uc, as illustrated in FIG. 5, whereby the quality of the surface of the first workpiece W1 can be improved. Furthermore, this reheating renders it possible to make the molten portion M thicker in the thickness direction of the throat thickness T in the vicinity of the end. As a result, the throat thickness T is ensured, whereby the welding strength between the first workpiece W1 and the second workpiece W2 can be ensured.

Furthermore, in the present embodiment, the end beams Lb4 are emitted at a power density lower than the power density at which the rear beam Lb3 is emitted. This feature makes it less likely for the non-end portions of the molten portion M to be reheated and makes it possible to reduce the influence on the non-end portions of the molten portion M.

Other Embodiments

The embodiment described above can be modified as follows, for example. Unlike the case illustrated in FIG. 1, in the optical head 20, the laser beam Lb is divided into a plurality of paths, and a plurality of the condensing lenses 23 may each emit a part of the divided laser beams Lb. Specifically, for example, a main beam Lb1 and sub beams Lb2 may be emitted from predetermined one of the condensing lenses 23, a rear beam Lb3 may be emitted from a different one of the condensing lenses 23, and end beams Lb4 may be emitted from a different one of the condensing lenses 23. In the first embodiment, three workpieces W1 to W3 are provided; but the number of workpieces may be two, or four or more.

EXPLANATION OF REFERENCE NUMERALS

Lb: Laser beam
Lb1: Main beam
Lb2: Sub beam
Lb3: Rear beam
Lb4: End beam
Rg1: Main region
Rg2: Sub region
Rg3: Rear region
Rg4*a*: Left end region
Rg4*b*: Right end region
W1: First workpiece
W2: Second workpiece
W3: Third workpiece

What is claimed is:

1. A laser welding method of welding a plurality of workpieces to each other, the laser welding method comprising emitting a laser beam onto a surface of a stack of the plurality of workpieces to thereby melt the plurality of workpieces, and moving the laser beam that is being emitted onto the surface of the stack in a predetermined traveling direction relative to the plurality of workpieces, the laser beam comprising:

a main beam that is emitted onto a predetermined main region;

a sub beam that is emitted onto a sub region surrounding the main region;

a rear beam that is emitted onto a rear region at a power density lower than a power density at which the main beam is emitted, the rear region located toward the opposite side of the traveling direction with respect to the main region; and an end beam that is emitted onto an end region, the end region located toward the opposite side of the traveling direction with respect to the rear region and outside in an orthogonal direction to the traveling direction with respect to an end of an entirety of the sub region in the orthogonal direction.

2. The laser welding method according to claim 1, wherein the end beam is emitted at a power density lower than the power density at which the rear beam is emitted.

* * * * *